United States Patent [19]

Pearce

[11] 4,117,632
[45] Oct. 3, 1978

[54] PLANT WATERING DEVICE

[76] Inventor: Woodrow W. Pearce, 911 Air Way, Glendale, Calif. 91201

[21] Appl. No.: 701,558

[22] Filed: Jul. 1, 1976

[51] Int. Cl.² ............................................ A01G 27/00
[52] U.S. Cl. ...................................................... 47/81
[58] Field of Search .............................. 47/67, 79–83, 47/66; 239/44–51.5

[56] References Cited

U.S. PATENT DOCUMENTS

| 129,451 | 7/1872 | Baldwin | 47/79 |
| 3,222,819 | 12/1965 | Marcan | 47/81 |
| 3,813,813 | 6/1974 | Powell | 47/81 |
| 3,958,366 | 5/1976 | Meyers | 47/81 |

FOREIGN PATENT DOCUMENTS

| 2,149,072 | 4/1973 | Fed. Rep. of Germany | 47/81 |
| 652,457 | 2/1963 | Italy | 47/81 |
| 457,287 | 11/1936 | United Kingdom | 239/51.5 |

Primary Examiner—Edgar S. Burr
Assistant Examiner—James R. Feyrer
Attorney, Agent, or Firm—Albert M. Herzig; Edward C. Walsh

[57] ABSTRACT

A watering device for growing plants. A container which may be a flower pot filled with soil or the like which has an aperture in the bottom. A second container for water is provided below the first container. A rigid probe having a central bore is provided that can be inserted through the aperture in the bottom of the first container or pot and extended up into the earth in the container. A wick has a part immersed in the water and a part extending up through the bore in the probe and is then wrapped around the probe and fastened. The probe is axially slotted to allow moisture to be drawn up through the wick and to transfer to the convolutions of the wrapped wick and for dissemination into the soil in the container.

9 Claims, 6 Drawing Figures

U.S. Patent        Oct. 3, 1978        4,117,632
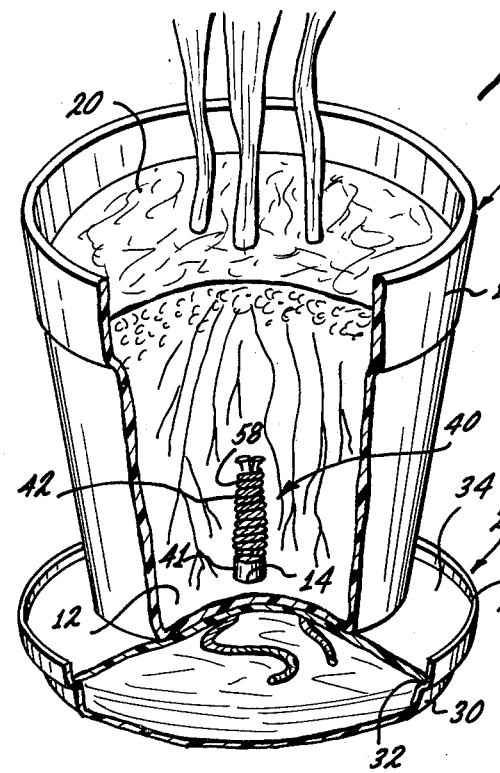
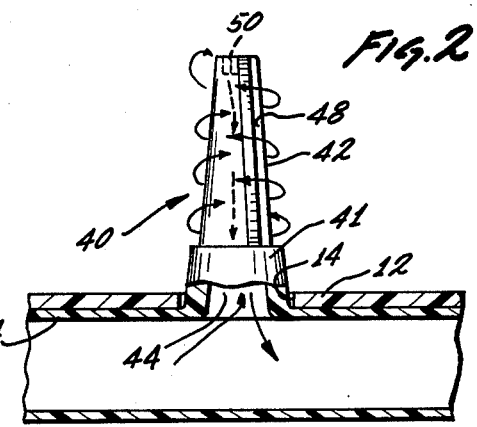
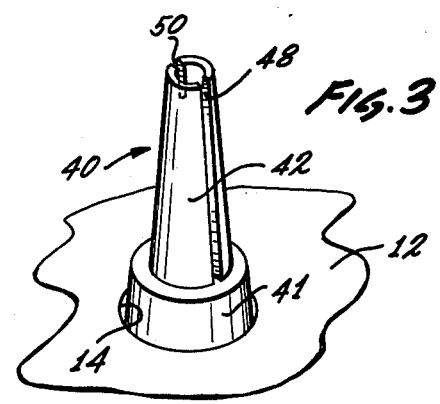
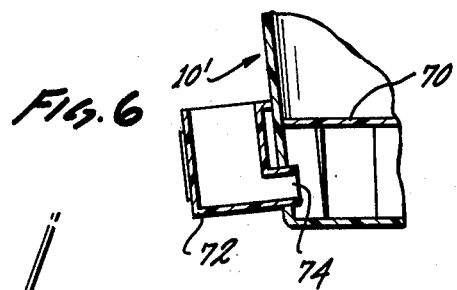
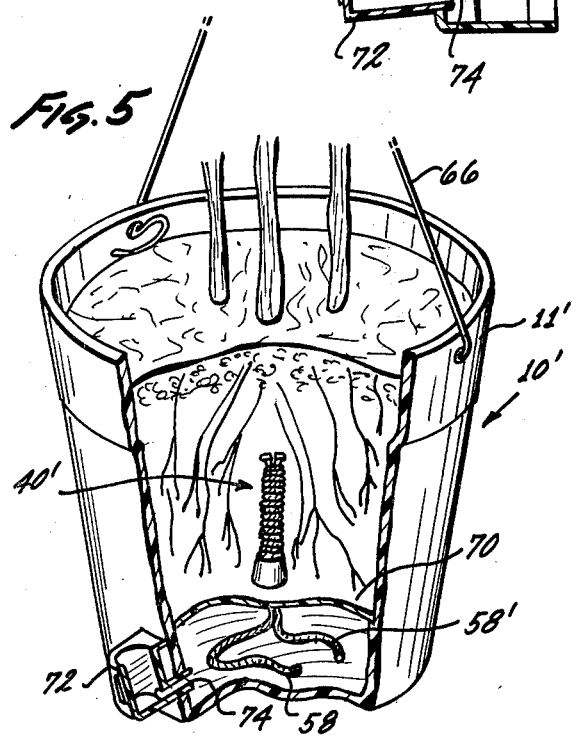
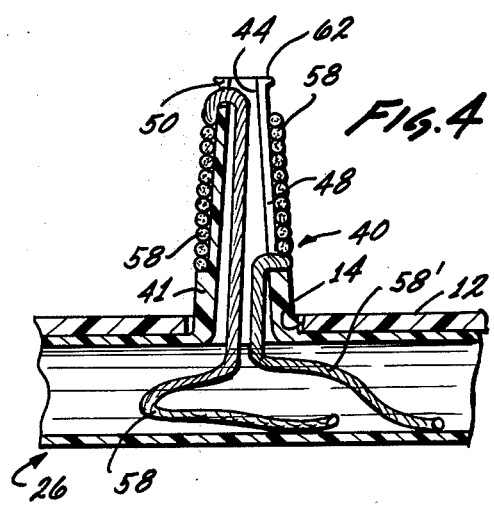

PLANT WATERING DEVICE

BACKGROUND OF THE INVENTION

1. Field of the Invention

The field of the invention is that of growing plants and more particularly to a scientific watering device adaptable for use with containers or pots for growing plants. In the exemplary form of the invention it is constructed to be adapted for use with any conventional flower pot or plant container.

2. Description of the Prior Art

Certain forms of plant watering devices have been known in the prior art such as exemplified in U.S. Pat. Nos. 1,216,642; 1,342,786; 2,691,245; and 3,455,055; also, French Pat. No. 1,544,194. The prior art as exemplified in these patents, however, has not had characteristics such as to be fully effective for the purpose. The prior art has been deficient in being fully effective to achieve transfer of water from a water supply by capillary attraction to the earth in the container or pot. The rate of transfer of water supplied to the soil or other material has not been sufficient.

SUMMARY OF THE INVENTION

The device of the invention is designed to provide water to a potted plant. Customarily, more typically potted plants are in a pot filled with earth. Typically, the pot is constructed of earthenware having an opening or aperture in the bottom. The herein invention embodies a pot constructed to include at the bottom of it a container for water which is to be fed to the earth in a pot by capillary attraction. In one form of the invention the pot or container for the plant sits on a flat platform which rests on a flange or shoulder provided on the inside of the walls of a dish containing water. The center of the platform is provided with an upstanding probe structure having a bore which can be passed upwardly through the opening in the bottom of the pot and then into the earth in the pot.

A cord or wick of variable size is provided which hangs into the water and extends up through the bore in the probe into the earth, the wick having a knot in it or otherwise being associated with the probe to facilitate transfer of water to the earth in the pot. In a preferred form as described in detail hereinafter, the probe is provided with one or more axial slots with a part of the wick extended through a slot and then wrapped around the probe and secured. The upper end of the probe, preferably is flanged to prevent the convolutions of the wick from coming off the probe.

In another form of the invention the pot is provided with a false bottom from which the probe extends upwardly with a filling device at the side of the pot for filling the portion underneath the false bottom with water.

The significance of the invention and its objections and advantages will be understood from the following. Normally, or typically, potted plants are set in a pan or dish and water is poured onto the earth in the pot. Customarily or typically, much more water is poured on then is necessary so that a large part, that is perhaps 75% of the water, is wasteage. The water percolates down through the earth and through the opening in the bottom of the pot and collects in the pan in which the pot is set. It becomes stale and stagnant and thus is polluted and contributes to the general pollution of the environment.

In the light of the foregoing the primary object of the invention is to provide improved automatic means for providing water to potted plants and the like and particularly to overcome the drawbacks set forth in the foregoing as respects water wasteage and pollution.

A further object is to make it unnecessary to have to water a plant every day or two as is typically done since the device provides for automatic watering of the plant.

A further object is to provide specific improvements in a device of the type referred to whereby the capability of the device to lift water by capillary attraction and to transfer it to the earth in the pot is improved, the improvement residing more particularly in a probe having a bore and having one or more axial slots with a part of the wick extended through a slot and then wound around the probe in convolutions and secured.

Further objects and additional advantages of the invention will become apparent from the following detailed description and annexed drawings.

BRIEF DESCRIPTION OF THE DRAWINGS

FIG. 1 is a pictorial cut away view of a preferred form of the invention;

FIG. 2 is a partial sectional view of a part of the device of FIG. 1, illustrating the platform and probe;

FIG. 3 is an illustrative view illustrating the construction of the probe;

FIG. 4 is a partial sectional view similar to FIG. 2 illustrating the construction of the probe and the winding of the wick around the probe;

FIG. 5 is a pictorial view partially in section illustrating another form of the invention;

FIG. 6 is a partial sectional view of a portion of FIG. 5 illustrating the water filling means.

DESCRIPTION OF THE PREFERRED EMBODIMENTS

Referring to FIGS. 1–4, numeral 10 designates a typical earthenware flower pot having a taper and an enlarged upper part 11. The pot has a bottom 12 in which is a hole or aperture 14 which is typical of the construction of flower pots. Typically, the pot contains earth as designated at 20 or similar material in which plants are adapted to grow.

Numeral 26 designates a dish or pan which may be of any suitable material such as plastic or the like having an enlarged upper part 28 presenting a vertical edge and having a lower part 30 of small diameter, there being an annular shoulder 32 between the parts of smaller and larger diameter. Numeral 34 designates a platform in the form of a disc of a size so that its edges can rest on the annular shoulder 32.

Integrally formed with the platform 34 and upstanding from the center of it is a tapered probe as designated at 40. The probe has a bottom part 41 of slightly larger diameter that fits into the aperture 14 in the bottom of the pot 10. The upper part of the probe as designated at 42 has a taper as shown and the probe has a bore 44. In one side of the probe there is an axial slot 48 extending from the end all the way to the lower part 41. Diametrically opposed from the slot 48 is a second slot 50 which extends only a short distance down with respect to the probe.

Numeral 58 designates a wick which may be made of a typical fabric type of material capable of carrying water through it by way of capillary attraction. The end part of the wick extends into water within the pan 26 as shown. The wick extends up through the probe 40 as may be seen in FIG. 4. One part of the wick as designated at 58′ passes through the bottom of the slot 48 and then the wick is wound around the tapered probe in a plurality of convolutions as shown. At the top convolution the wick is brought inwardly through the smaller axial slot 50 and extends axially through the bore 44 in the probe.

Preferably the material of the probe is made of plastic subject to being heat sealed and heat sealing is applied to the upper end of the probe so as to form a flange thereon as designated at 62 which serves to prevent the convolutions of the wick from pulling off the upper end of the probe.

In operation the parts are assembled in FIG. 1, the wick being arranged on the probe in convolutions as described. A probe with the wick thereon is extended up through the aperture 14 in the bottom of the pot 10 and up through the earth therein. The flange 62 is small enough to not interfere with the insertion of the probe into the earth in the pot. Then, in operation moisture is carried up through the wick by capillary attraction and into the convolutions which normally are kept moist by virtue of the capillary attraction and the moisture is continuously transferred to the earth in the pot. In this manner all of the objects of the invention, as identified in the foregoing, are realized and the pan 26 need only be filled with water at intervals. The moisture permeates through the soil in the pot, keeping it moist as desired and providing whatever nutrients may be appropriate which can be put into the water in the pan 26.

FIG. 5 shows a modified form of the invention wherein the pot 10′ is in all respects like the pot of the previous embodiment except as set forth hereinafter and that it is adapted to be hung by way of a cord attached to the pot as designated at 66. The pot is provided with a false bottom 70 having upstanding from it a probe that is designated at 40′ which is in all respects like the probe 40 previously described. Water is kept in the pot below the false bottom 70. At the side of the pot there is provided a filler fitting 72 which is a cup-like fitting having a horizontal tubular part 74 at the bottom which extends through the side wall of the pot 10′ into the space below the false bottom 70. Water is fed into the bottom of the pot through the filler fitting or cup 72. Wick 58-58′ is provided as in the previous embodiment. This embodiment operates in the same manner as the previous embodiment and realizes the objects of the invention in the same way.

From the foregoing those skilled in the art will readily understand the nature of the invention, its construction and the manner in which it realizes all of the objects and advantages as set forth in the foregoing.

The foregoing disclosure is representative of preferred forms of the invention and is to be interpreted in an illustrative rather than a limiting sense the invention to be accorded the full scope of the claims appended hereto.

I claim:

1. A plant watering device including a container containing material for growing a plant, means below the container for holding a supply of water, at least one probe extending upwardly in the container into said material, the probe having a central bore and being perforated so that a passage is provided through said probe between said material and said means for holding a supply of water, and a wick having one end submerged in water contained in said means for holding a supply of water and extending upwardly through the probe and out through a perforation in said probe with a second end of said wick being wrapped around the outside of the probe forming convolutions positioned in contact with said material whereby water can be drawn up through the wick by capillary attraction and into and out through the probe and delivered to the material in the container.

2. A device as in claim 1, wherein the said probe has an axial slot in it for accommodating the wick for passage through the slot.

3. A device as in claim 1, wherein the probe has a flange at the top to prevent convolutions of wick from coming off the probe.

4. A plant watering device as in claim 1, wherein the said water supply means at the lower part of the container includes a pan for holding water, the said pan providing a shoulder, and a platform resting on the said shoulder, the said probe extending from the platform.

5. A device as in claim 1, wherein the probe has an opening in the side thereof, the wick having a portion extending from one of the convolutions into the bore of the probe.

6. A device as in claim 5, wherein said opening is in the form of an axial slot.

7. A device as in claim 6, wherein the probe has a second axial slot, the portion of the wick extending through the bore having a part passing through said second slot and then forming a convolution.

8. A device as in claim 1, wherein the container is provided with a false bottom so that water can be held in the container below the false bottom, the said probe extending upwardly from the false bottom.

9. A device as in claim 8, including filler means positioned at the side of the container and having communication with the container below the false bottom for filling with water.

* * * * *